(12) United States Patent
Shea

(10) Patent No.: US 6,409,229 B1
(45) Date of Patent: Jun. 25, 2002

(54) PLASTIC PIPE AND DUCT JOINT CONNECTIONS

(76) Inventor: Lawrence E. Shea, 2809 Mountains Springs Rd., Reno, NV (US) 89509

(*) Notice: Subject to any disclaimer, the term of this patent is extended or adjusted under 35 U.S.C. 154(b) by 0 days.

(21) Appl. No.: 09/711,719

(22) Filed: Nov. 13, 2000

(51) Int. Cl.$^7$ .................................................. F16L 13/10
(52) U.S. Cl. ...................... 285/371; 285/423; 285/915; 285/285.1; 285/21.1; 156/330
(58) Field of Search ................................ 285/371, 21.1, 285/21.2, 915, 285.1, 423; 428/36.9; 156/330, 92

(56) References Cited

U.S. PATENT DOCUMENTS

| | | | | |
|---|---|---|---|---|
| 159,439 A | * | 2/1875 | Moore ......................... | 285/371 |
| 3,768,841 A | * | 10/1973 | Byrne et al. ................. | 285/371 |
| 4,257,630 A | * | 3/1981 | Bartell et al. ................ | 285/371 |
| 4,997,213 A | * | 3/1991 | Traner et al. ................ | 285/371 |
| 5,383,994 A | * | 1/1995 | Shea ........................... | 156/175 |
| 5,449,320 A | * | 9/1995 | Shea ........................... | 454/49 |
| 5,505,497 A | * | 4/1996 | Shea et al. .................... | 285/55 |
| 5,549,949 A | * | 8/1996 | Williams et al. ............ | 428/36.9 |
| 5,634,847 A | * | 6/1997 | Shea ........................... | 454/342 |
| 5,961,154 A | * | 10/1999 | Williams et al. ............ | 285/371 |
| 6,022,054 A | * | 2/2000 | Hemphill et al. ........... | 285/915 |

FOREIGN PATENT DOCUMENTS

| | | | | |
|---|---|---|---|---|
| FR | 358855 | * | 3/1906 | ................. 285/371 |
| SU | 1657826 | * | 6/1991 | ................. 285/371 |

* cited by examiner

Primary Examiner—Eric K. Nicholson
(74) Attorney, Agent, or Firm—William Hamrock, P A

(57) ABSTRACT

The invention relates to a joint assembly for connecting together fiberglass cylindrical pipe and duct sections up to about one hundred and twenry inches in diameter. An internal tubular slip collar fits into opposing sections joining the sectionend to end. An external tubular slip collar is mounted over the joined sections encircling their exterior surfaces. A non-volatile epoxy adhesive secures the mating surfaces forming a double adhesive sealed and three level joint.

14 Claims, 3 Drawing Sheets

PLASTIC PIPE AND DUCT JOINT CONNECTIONS

BACKGROUND OF THE INVENTION

There is a very large quantity of plastic pipe and duct used in numerous industries because of their beneficial corrosion resistance to a broad range of aggressive chemicals. Almost all plastic pipe and duct are limited in how long a length of material can be shipped, usually about twenty to a maximum of sixty feet long. These pieces are invariably fastened together at a jobsite to make longer lengths and/or connections to fittings. There are also a number of different means of joining them, including built in slip fittings or couplings, particularly with small diameter materials. Usually some sort of adhesive may be used which "melts" the base material of the pipe or duct, such as PVC, thereby making a chemical connection. Alternative means is by screw threads on the pieces of duct or pipe similar to those used for steel pipe, or flanged connections. Applicant's U.S. Pat. No. 5,909,904 for Flange Joint Assemblies discloses new and improved mechanical flange connections for plastic pipe or duct.

Many of these cannot be used easily or cost effectively on fiberglass pipe or duct, particularly on large sizes such as 60 inch or 1.5 meters in diameter. Flanged joints are often used but these are very expensive. Normally the two pieces of connecting pipe or duct are sanded on their exteriors, and over wrapped with fiberglass or other materials which is saturated with a desired resin. This resin hardens to make a hopefully leakproof joint. The ability of achieving the latter depends on the skill of the applicator and the quality of the materials.

There are normally two different types of fiberglass joints, the butt and wrap joint (A) and the bell and spigot joint (B) as depicted in FIG. 1. In the butt joint the ends of each piece of pipe or duct are cut and have their ends squared off and are of the same size. Various means such as metal clips are used to hold the assembly together until such time after the glass and resin are applied and the resin hardens. The metal clips are left inside the assembly, which rot out prematurely causing early joint leaks in the system.

Alternatively, a bell and spigot joint (B), as depicted in FIG. 1, may be used; here one end of one piece of duct or pipe is full diameter. The mating end of the connecting duct has been enlarged so that its inside diameter is sufficient to accept the outside diameter of the connecting piece. Again some method of holding the assembly together is used until the exterior of the joint may be sanded, the resins mixed, and for glass or other materials to be wrapped around the joint, saturated with resin, and the resin hardens.

The process of making these joints is messy; glass particles get inside workmen's clothes, and irritate their skin, and often the resin not only has an unpleasant odor, but may be toxic, carcinogenic or cause rashes. The present invention is a unique and improved joint assembly and method of making these joint assemblies which is simpler, quicker and less expensive than making "normal" butt and wrap joints, bell and spigot joints or flanged joints in the field.

BRIEF SUMMARY OF THE INVENTION

Briefly stated, the present invention provides a joint assembly for connecting together cylindrical plastic pipe or duct sections, preferably fiberglass pipe or duct sections. The pipe or duct sections generally are about twenty to forty feet in length and have a diameter of up to about one hundred and twenty inches. An internal tubular slip collar having a diameter slightly less than that of the pipe or duct sections fits into their opposing abutting end interiors joining the sections end to end. An external tubular slip collar having a diameter slightly greater than the pipe or duct sections is mounted over the joined opposing abutting pipe or duct sections encircling their exterior surfaces. A special non-volatile organic epoxy resin adhesive, non-VOC, has been previously applied in the joining of the mating surfaces of the internal and external slip collars and the pipe or duct sections providing a double adhesive sealed and three level permanent joint previously unobtainable.

BRIEF DESCRIPTION OF THE DRAWINGS

For a more complete understanding of the present invention and the advantages thereof, reference is made to the following description taken in conjunction with the accompanying drawings in which.

DETAILED DESCRIPTION OF THE INVENTION

The first elements are the pieces as an example in this case of fume exhaust duct which have squared ends as one might have in a butt and wrap joint (A). The benefit to this is that one can cut a fiberglass reinforced plastic duct or pipe which is usually made in 20 or 40 foot lengths without worrying whether one has just cut a bell off of a piece of duct or pipe which may be needed elsewhere.

Figure 3:
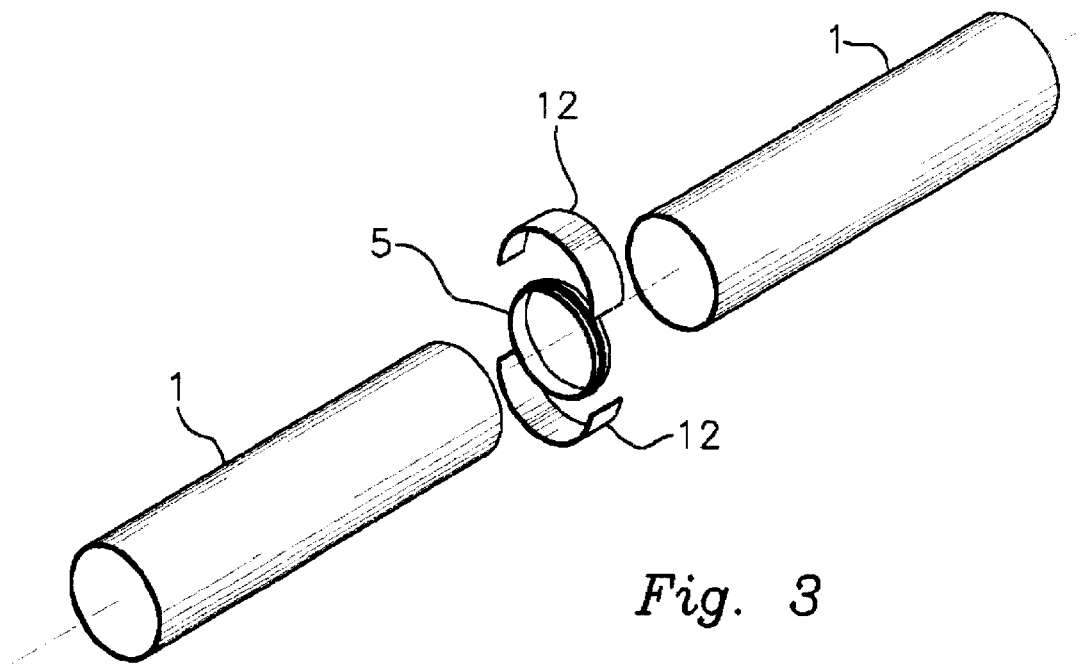
FIG. 3 is an exploded perspective view of the preferred embodiment of the invention.

Shown in FIG. 3 is an internal slip collar 5, applicant's new and improved flange connections made on a special diameter tool, so the outside diameter is smaller than the inside diameter of duct or pipe pieces 1 and will slip easily into the inside. The ducts can be made with two different resins. For example, the inside surfaces of 1 may be made with a resin noted for its corrosion resistance, where as its outer surfaces may be made with a different resin noted for its fire resistance. The internal slip collar 5 would be made of the same resin as used for the corrosion liner of 1.

External slip collar 12 is similar to internal slip collar 5. It is intended to slip over the outside of duct or pipe pieces 1, thus it needs no bead in the center, though one may be helpful. Eyeball estimates for location of the external slip collar 12 are good enough. A special non-volatile organic compound; i.e. an epoxy resin with 100% solids is painted or trowled on the outside of the duct or pipe pieces and/or the inside of the external collar 12 or both. This provides a permanent double adhesive sealed mating of the parts, and a three level or three piece joint-internal slip collar 5, duct or pipe pieces 1 and external slip collar 12 combined. It is incredibly strong and leak-proof. The additional benefit of this type of joint is that the internal slip collar 5 can be made of a resin that has excellent corrosion resistance, which protects the balance of the structure from degradation. However, the external slip collar 12 can be made of a different resin system, which has excellent fire resistance, though may not have as good corrosion resistance.

Thus for example one can make a duct or piping system that has both superior chemical resistance as well as fire resistance by using alternative materials in the same structure as disclosed in applicant's U.S. Pat. No. 5,383,994 which is incorporated herein by reference.

Figure 1A:
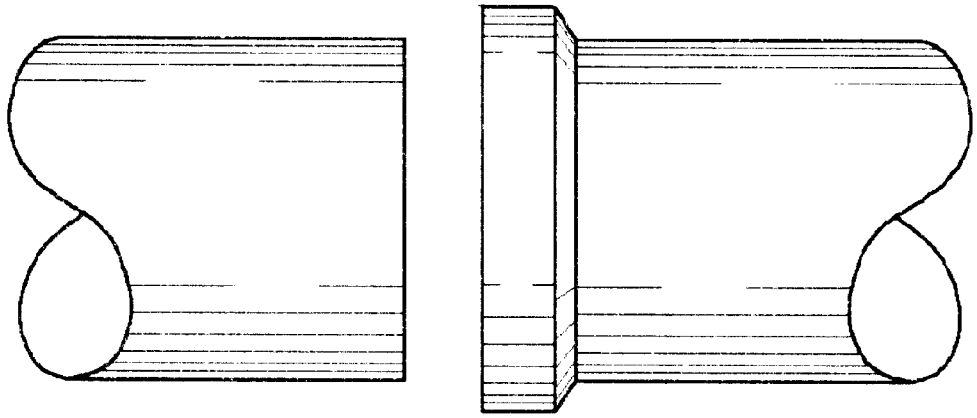
FIG. 1 is a view of joints of fiberglass sections.
Figure 1B:
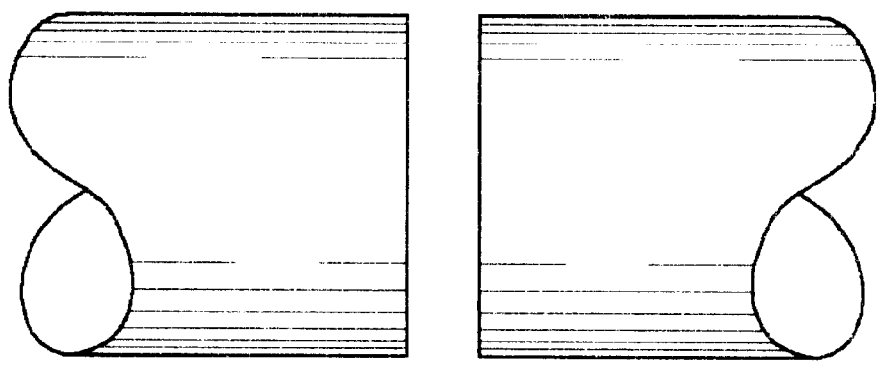
Figure 2:
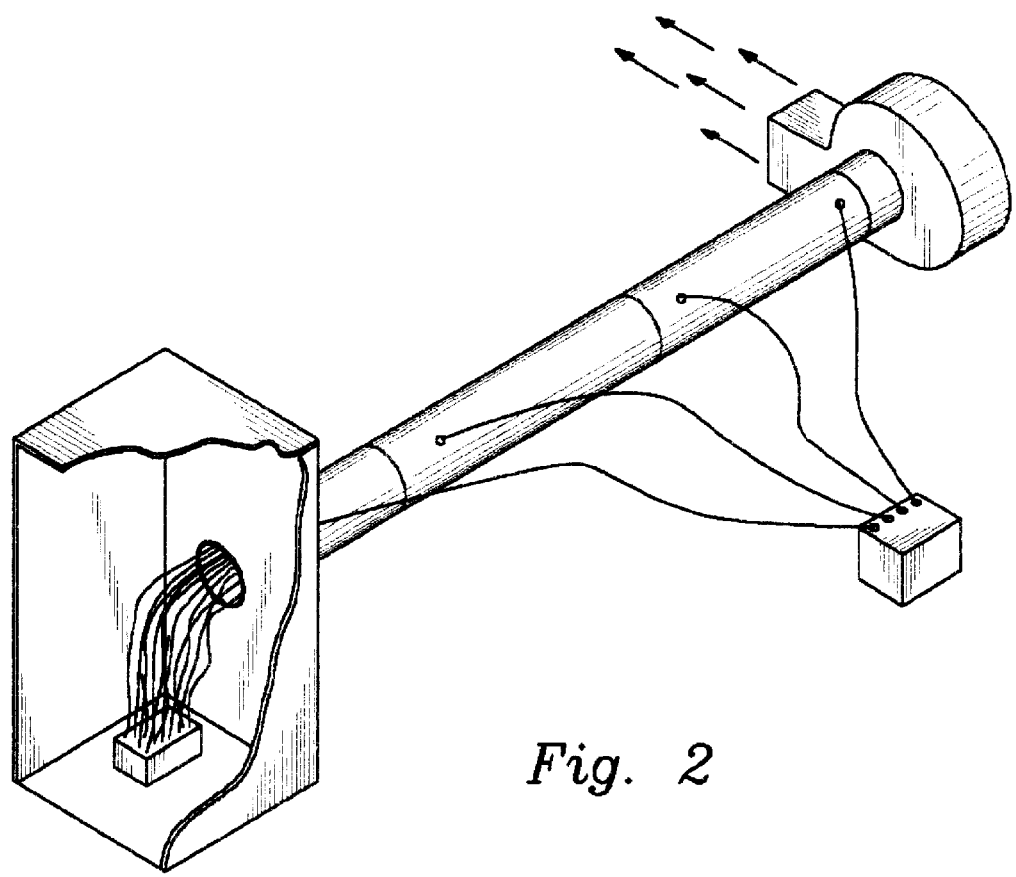
FIG. 2 is an illustration of a Factory Mutual #4922 test setup.

A case in point is the severe Factory Mutual #4922 duct fire test depicted in FIG. 2. Factory Mutual Global FM insures many billions of dollars of industrial facilities, and is prominent in the semiconductor industry. Factory Mutual Global has its own standards, superceding local building and fire codes. An installation may meet the local building or fire codes, but if the duct or piping system burns down and causes a one billion-dollar loss, all the codes didn't matter. Thus, concerned as to what happens if a fire starts on the inside or outside of a pipe or worse a duct—the major concern is fire resistance. On a duct there is concern of both fire and potential smoke contamination. If the exterior is attacked by fire that surface must be fire resistant to prevent the spread of fire in a manufacturing plant or aboard a ship.

If the fire is inside the tube it can spread quickly both inside and/or outside. However, with the proper selection of materials, one can control the spread of fire. The #4922 FM test, as depicted in FIG. 2, determines this, and the system proposed here has been tested and approved for use as a fume exhaust duct connection, a smoke removal duct, and the allowance to be used in semiconductor manufacturing clean rooms.

Semiconductor clean rooms are a special case. Not only does the owner have to worry about microscopic dust particles at the time of initial installation, but also a worse scenario occurs after the system is operating, and changes or additions in equipment require a change in the size, location or orientation to the original duct system.

Many times these exhaust duct systems are of large magnitude, maybe two miles (3.2 Km) of duct, thousands of fittings, in sizes as small as 2 inches (5 cm) to ducts 10 foot (3 meters) in diameter. Needless to say, there are often thousands of joints to be made on the initial installation and perhaps hundreds later on. To have to sand, mix resin, saturate fiberglass and roll it out when the duct may be 25 feet (7.5) meters off the floor is a sizable headache.

In the Factory Mutual #4922 duct fire test depicted in FIG. 2 which the present system has passed, the fire may not spread further along the inside of the duct for a distance of 23 feet, 7 meters, or greater, and is usually much less than that. It also cannot proceed further on the exterior. The smoke given off by the resin on the inside of the duct, if any, is confined and exhausted from the system through wet scrubbers with the main contaminated air stream. The amount of smoke given off by the exterior of the duct must be very little; a special test (FM #4010) is run to determine this since the clean room atmosphere must be protected.

Thus, a duct and its jointing system must be made to provide superior chemical resistance, fire resistance and very low smoke evolution.

Economics also enters into the picture, in addition to health and comfort concerns. When one is attempting to make a connecting duct or pipe joint in the field, if one must first pre-sand the parts, and then wrap them with fiberglass and roll them out with smelly resins, it's a time consuming and unpleasant experience for the installers. However, if the exterior "wrap" is an external slip collar that is already a finished piece, and one does not have to do any sanding, weighing out or mixing of different resins, and there's no discomfort to field workers form odor or rash causing materials, they would all prefer a system that avoids these problems.

Thus this new way of doing things not only affords economic benefits, but also health and comfort benefits.

Figure 4:
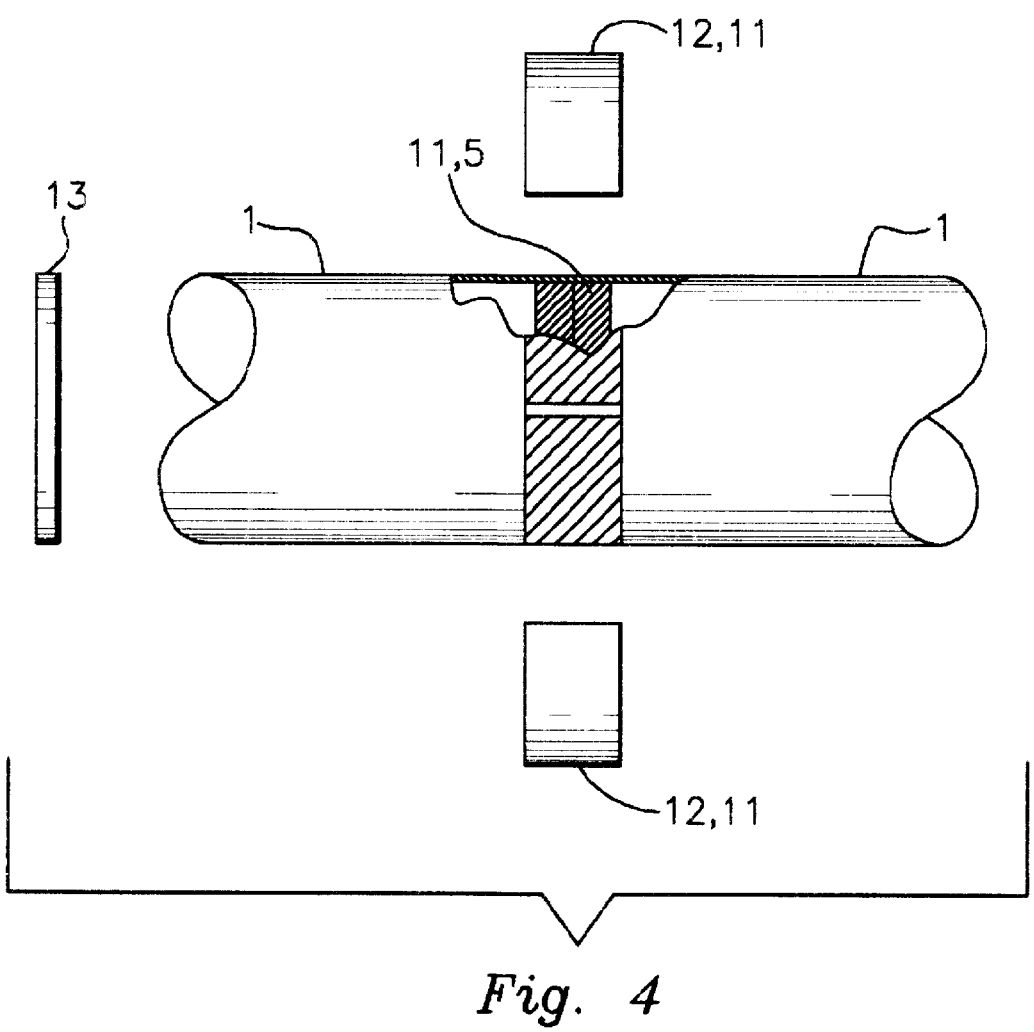
FIG. 4 is an exploded illustration view of the preferred joint assembly of the invention.

For example, if the external slip collar part 12 depicted in FIGS. 3 and 4 can be made at the duct or pipe manufacturer's plant instead of at the jobsite, it is easier to produce the part; i.e. the glass layers for the joint are already made in a shop environment, the resins have been used properly by weight and quantity, and the curing cycle to make a firm part have already been addressed.

External slip collar 12 can be cut in two as depicted in FIGS. 3 and 4 to make a clamshell type of part that can be applied later in the field. It need only be placed over duct or pipe pieces 1 and internal slip cover 5 after the non-volatile organic compound resins have been applied. These mix ratios are very simple; they are based on volume, not weight. They have no odor and create no health hazards for the workmen. The two parts of the clamshell external slip collar 12 must be held together onto the main duct 1 till the resin cures and this can be done in a number of ways. The simplest is to place a metal strap 13 in FIG. 4 around the perimeter of external slip collar 12. Straps similar to hose clamps may be used. Cam locks may be applied to each half, which lock onto each other. Velcro straps may be used. Such alternative hardware may be left in place permanently, or removed when the parts are cured.

A preferred method of assembling the the pipe and duct joint connections is depicted in FIG. 4.

Step 1: Apply the non-volatile organic resin compound, preferably epoxy resin, No-VOC 11, onto the side of the internal slip collar 5.

Step 2. Insert the internal slip collar 5 and 11 into duct 1 up to the centerline bead. Apply the No-VOC resin compound 11 onto the adjacent side of internal slip collar 5.

Step 3. Position the adjacent duct 1 onto internal slip collar 5 up to the center-line bead.

Step 4. Apply the No-VOC resin compound 11 to the exterior of duct 1 uniformly straddling the joint to the width of external collar 12.

Step 5. Position external collar 12 over the joint and firmly press inward down against the joint.

Step 6. Secure external collar 12 by applying a temporary strap clamp 13 around external collar 12 and tighten until a small bead of resin appears between external duct 12 and duct I and remove excessive resin. Temporary strap clamps can be any number of items that can be applied to secure external collar 12 in their proper place while the No VOC resin is curing.

Step 7. After the No VOC joint resin has cured, remove the temporary strap clamp if desired.

Another alternative embodiment is to completely assemble internal slip collar 5 and external collar 11 together, on one end only, at the pipe or duct manufacturer's plant and ship it as an intergral part of the duct Duct 1 requires the inside and outside surfaces to have the epoxy non-volatile organic resin applied to them prior to assembling the total joint.

In another embodiment, this method permits securing joints underwater by using an epoxy that will cure underwater- sometimes required to do in connecting pipe systems.

To those skilled in the art to which this invention relates, many changes in resins and construction, in addition to widely differing embodiments and applications of the invention will make themselves known without departing from the spirit and scope of the invention. The disclosure and description therein are purely illustrative and are not intended to be in any sense limiting.

What is claimed:

1. A joint assembly for joining together end to end plastic pipe or duct sections having interior and exterior walls, comprising an internal tubular resin slip collar having exterior walls with an outside diameter less than the diameter of said pipe and duct sections interior walls, an external tubular resin slip collar having interior walk with an inside diameter greater than the diameter of said pipe and duct sections exterior walls, whereby the internal slip collar is mounted with the joined pipe or duct sections interior walls, whereby the external slip collar is mounted around the joined pipe or duct sections, whereby the internal slip collar and joined pipe and duct sections are adhesively bonded together and the external slip collar and the pipe or duct sections are adhesively bonded together, whereby the plastic pipe or duct sections comprie fiberglass and the joint assembly has passed the Factory Mutual #4922 fire test.

2. The joint assembly according to claim 1 wherein the adhesive is non-volatile organic compound epoxy resin.

3. The joint assembly according to claim 1 whereby there is an exterior bead encircling the exterior walls of at least one of the internal or external slip collars dividing their exterior surfaces into two opposing exterior portions.

4. The joint assembly according to claim 1 wherein said duct or pipe sections have fire resistant resin outer surfaces and corrosion resistant resin inner surfaces.

5. The joint assembly according to claim 4 wherein said internal slip collar is prepared from the same corrosion resistant resin or other resins having equivalent corrosion resistance and at least equivalent fire resistance.

6. The joint assembly according to claim 5 wherein said other resins comprise epoxy or thermplastic resins.

7. The joint assembly according the claim 5 wherein said external slip collar is prepared from the same fire resistant resin.

8. The joint assembly according to claim 1 wherein said external slip collar is fabricated separately as a finished product ready for use.

9. The joint assembly according to claim 1 wherein the pipe or duct sections have diameters up to about one hundred and twenty inches.

10. The joint assembly according to claim 1 wherein the external slip collar comprises two half portions forming a clamshell type unit.

11. The joint assembly according to claim 1 wherein the external slip collar is mounted along with the internal slip collar on one end of the duct or pipe, prior to joining the pipe or duct sections together.

12. A method of joining together end to end fiberglass pipe or duct sections having interior and exterior walls comprising, adhesively mounting an internal tubular resin slip collar having exterior walls with an outside diameter less than the interior diameter of said pipe or duct sections within the interior of each pipe or duct section and joining them together, adhesively mounting an external tubular resin slip collar having interior walls with an inside diameter greater than the diameter of said pipe or duct sections around the joined pipe or duct sections to form a double adhesive sealed three pieces joined surfaces.

13. A method according to claim 12 whereby the adhesive is non-volatile organic compound epoxy resin.

14. The method according to claim 13 wherein the epoxy resin is applied under water.

* * * * *

UNITED STATES PATENT AND TRADEMARK OFFICE
CERTIFICATE OF CORRECTION

PATENT NO.     : 6,409,229 B1
DATED          : June 25, 2002
INVENTOR(S)    : Lawrence E. Shea It is certified that error appears in the above-identified patent and that said Letters Patent is hereby corrected as shown below:

Column 5,
Line 8, cancel "walk" and substitute -- wall --.
Lines 33-36, cancel claim 2.

Column 6,
Lines 31-32, cancel claim 13.
Lines 33-34, cancel claim 14.

Claims 2, 13 and 14 are dependent claims dependingon claim 1 and no claimsare dependent on claims 2, 13 and 14.

Signed and Sealed this

Twenty-second Day of April, 2003

JAMES E. ROGAN
*Director of the United States Patent and Trademark Office*